United States Patent [19]

Beaston

[11] Patent Number: 4,844,408

[45] Date of Patent: Jul. 4, 1989

[54] COUPLING DEVICE

[75] Inventor: Brook J. Beaston, Wichita, Kans.

[73] Assignee: Great Plains Industries, Inc., Wichita, Kans.

[21] Appl. No.: 180,355

[22] Filed: Apr. 11, 1988

[51] Int. Cl.[4] .............................................. F16L 37/28
[52] U.S. Cl. ................................. 251/149.8; 251/149.5
[58] Field of Search ................ 137/614.03; 251/149.8, 251/149.5, 144

[56] References Cited

U.S. PATENT DOCUMENTS

| | | | |
|---|---|---|---|
| 1,600,481 | 9/1926 | Nadig | 251/149.8 |
| 2,254,997 | 9/1941 | Fisher | 284/19 |
| 2,304,390 | 12/1942 | Wolfram | 284/19 |
| 2,441,363 | 5/1948 | Krueger | 285/174 |
| 2,451,218 | 10/1948 | Hengst | 284/19 |
| 2,457,251 | 12/1948 | Main, Jr. | 284/19 |
| 2,485,006 | 10/1949 | Main, Jr. et al. | 284/19 |
| 2,601,339 | 6/1952 | Snyder | 251/149.8 |
| 2,821,412 | 1/1958 | Frye | 284/18 |
| 3,039,794 | 6/1962 | De Cenzo | 284/19 |
| 3,359,015 | 12/1967 | Zahuranec | 251/149.8 |
| 3,474,827 | 10/1969 | Rosell | 137/614.06 |
| 3,885,608 | 5/1975 | Ayres | 141/354 |
| 4,219,048 | 8/1980 | Ekman | 137/614.03 |
| 4,269,389 | 5/1981 | Ekman | 251/149.6 |
| 4,483,368 | 11/1984 | Panthofer | 137/614.04 |

FOREIGN PATENT DOCUMENTS

| | | | |
|---|---|---|---|
| 1120330 | 7/1956 | France | 251/149.5 |
| 425141 | 3/1935 | United Kingdom | 251/149.8 |

Primary Examiner—A. Michael Chambers
Attorney, Agent, or Firm—Bill D. McCarthy

[57] ABSTRACT

A coupling device comprised of a male unit and a female unit used to connect and disconnect flow conducting members. The barrel of the male unit is inserted into the barrel of the female unit when the device is operatively engaged. When so engaged, the respective output ports of the male and female units are indexed. The male input port and the female output port can then be connected to respective flow conducting members so that fluid flow is facilitated.

11 Claims, 4 Drawing Sheets

COUPLING DEVICE

BACKGROUND OF THE INVENTION

1. Field of the Invention

The present invention relates generally to apparatus for flow conducting devices, and more particularly but not by way of limitation, to apparatus for quick connection and disconnection of flow conducting members in the use of liquid herbicides and the like.

2. Brief Description of the Related Art

Herbicides play a dominant role in the control of unwanted plant growth in modern agribusiness. Historically, farmers have had unlimited access to herbicides in various kinds of packaging such as small metal cans. Due to environmental considerations, modes of distribution are increasingly regulated and restricted for toxic substances such as herbicides. Farmers must often store a large volume of herbicide in a tank prior to use in order to comply with regulations. The present invention is intended to aid the farmer connect herbicide vessels in a quick fashion with minimal efficiency.

None of the prior art specifically teaches applications for herbicide dispensing systems. Most of the art, like the present invention, has general application in connecting members which conduct fluid flow. Much of the art was developed in the 1940s in the context of airplane fueling systems. Main, U.S. Pat. No. 2,457,251 issued Dec. 28, 1948, and Fisher, U.S. Pat. No. 2,254,997 issued Sept. 2, 1941, are two representative patents from that era. A problem that neither patent resolves is port indexing, i.e. the ports of the coupling members are not indexed, therefore the flow axis is obstructed by the internal apparatus of the invention. Also, neither patent effectively addresses the problem of leakage during engagement and disengagement. Finally, the related inventions do not solve the problem of internal fluid pressure buildup due to repeated engagement and disengagement with fluid in the apparatus.

SUMMARY OF THE INVENTION

The present invention provides unobstructed fluid flow within the coupling device by indexing the ports of fluid flow. A male barrel, having a male output port, is inserted into a female barrel which has a female output port. The male barrel and female barrel are coaxially disposed along a first flow axis. The coupling device is designed and constructed so that when the male barrel is fully inserted, the respective ports are indexed, thereby allowing the apparatus to conduct fluid without obstruction.

The present invention prevents fluid leakage, particularly during engagement and disengagement. A seal is mounted on a slide member. Likewise, a seal is mounted on the female barrel member. Fluid which is already in the apparatus is thereby retained during disengagement, and fluid which is outside the apparatus is excluded during engagement.

The present invention prevents fluid pressure buildup within the coupling device. When a coupling device is connected to flow conducting members on either end and becomes primed by repeated engagement and disengagement, fluid pressure can build up in the male unit. This causes subsequent engagement and disengagement of the coupling device to become increasingly difficult. This is solved by a plurality of bleed ports disposed near the upstream end of the male barrel member. Fluid is displaced back into the male barrel member, thereby maintaining at a minimum the force necessary for engagement and disengagement.

Objects, features and advantages of the present invention will be apparent from the following detailed description when read in conjunction with the drawings and appended claims.

BRIEF DESCRIPTION OF THE DRAWINGS

FIG. 2A is a blowup view of the downstream end of the male unit.

FIG. 3A is a blowup view of the upstream end of the female unit.

DESCRIPTION

Many systems which have two or more vessels for fluid storage need modes of transfer between the vessels. Hoses or tubes are commonly used. A common problem is how to connect these flow conducting members quickly and easily for efficient fluid transfer between vessels.

The present invention solves this problem by allowing flow conducting members to be quickly connected manually with little or no leakage. Although this system was designed with herbicides in mind, the system would work equally well for most other systems requiring connection of flow conducting members for fluid transfer.

Figure 1:
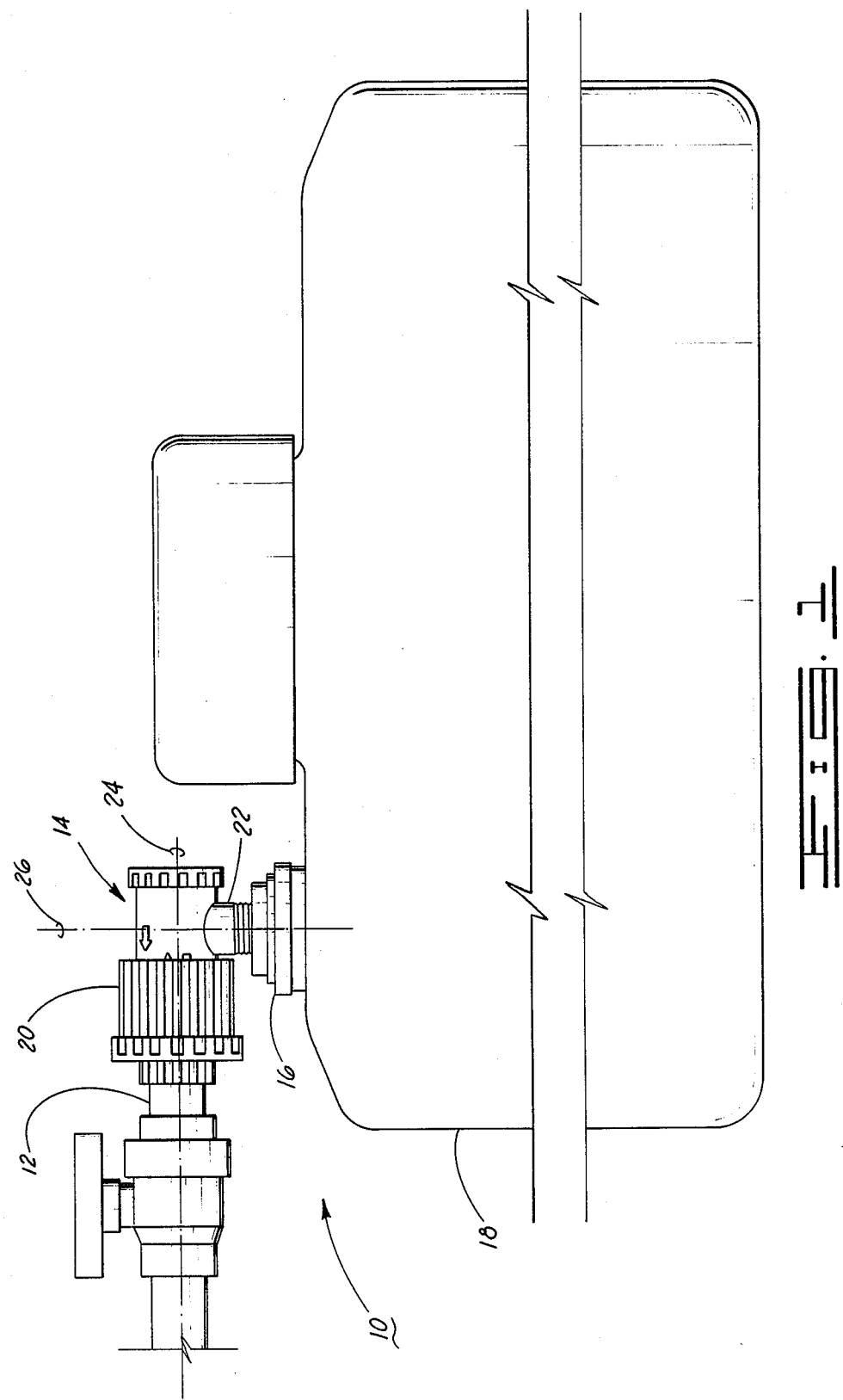
FIG. 1 is a cross sectional view of a herbicide dispensing system. A coupling device is operationally engaged in accordance with the present invention and connected to an upstream flow conducting member and to a downstream flow conducting member in conjunction with a herbicide storage tank.

Referring now to the drawings in general and to FIG. 1 in particular, shown therein and designated by the general reference 10 is an assembly for transferring herbicides. A first flow conducting member 12 is designed for conducting fluids. A coupling device 14, constructed in accordance with the present invention, is connected to the first flow conducting member 12 and a second flow conducting member 16. The coupling device 14 can be constructed out of any durable, hard material, such as metal or plastic. The second flow conducting member 16 is connected to a storage tank 18 which stores fluid conducted into it via the first flow conducting member 12, the coupling device 14 and the second flow conducting member 16.

The first flow conducting member 12 is upstream from the coupling device 14, and the second flow conducting member 16 and the storage tank 18 are downstream from the coupling device 14. That is, the terms "upstream" and "downstream" as used herein will be for descriptive purposes. It will be apparent that the coupling device 14 can be used to conduct fluid in either direction, the flow as herein discussed will assumed to be such that the first flow conducting member 12 is connected to an upstream storage or dispensing vessel upstream thereto but not shown in FIG. 1. The configuration of the coupling device 14 connected to the first flow conducting member 12 and the second flow conducting member 16 is for illustrative purposes only, and it will be appreciated that countless other configurations utilizing the coupling device 14 with flow conducting members not shown are possible.

The coupling device 14 is comprised of a male unit 20 and a female unit 22. The male unit 20 extends along a first flow axis 24, while the female unit 22 has associated with it a second flow axis 26. In FIG. 1, the male unit 20 and female unit 22 are operationally engaged, i.e. they are removably attached so that fluid can be conducted along the first flow axis 24 to the second flow axis 26 through the coupling device 14 without leakage. Generally, when the coupling device 14 is operationally engaged, the first flow axis 24 is horizontal and the second flow axis 26 is vertical.

Figure 2:
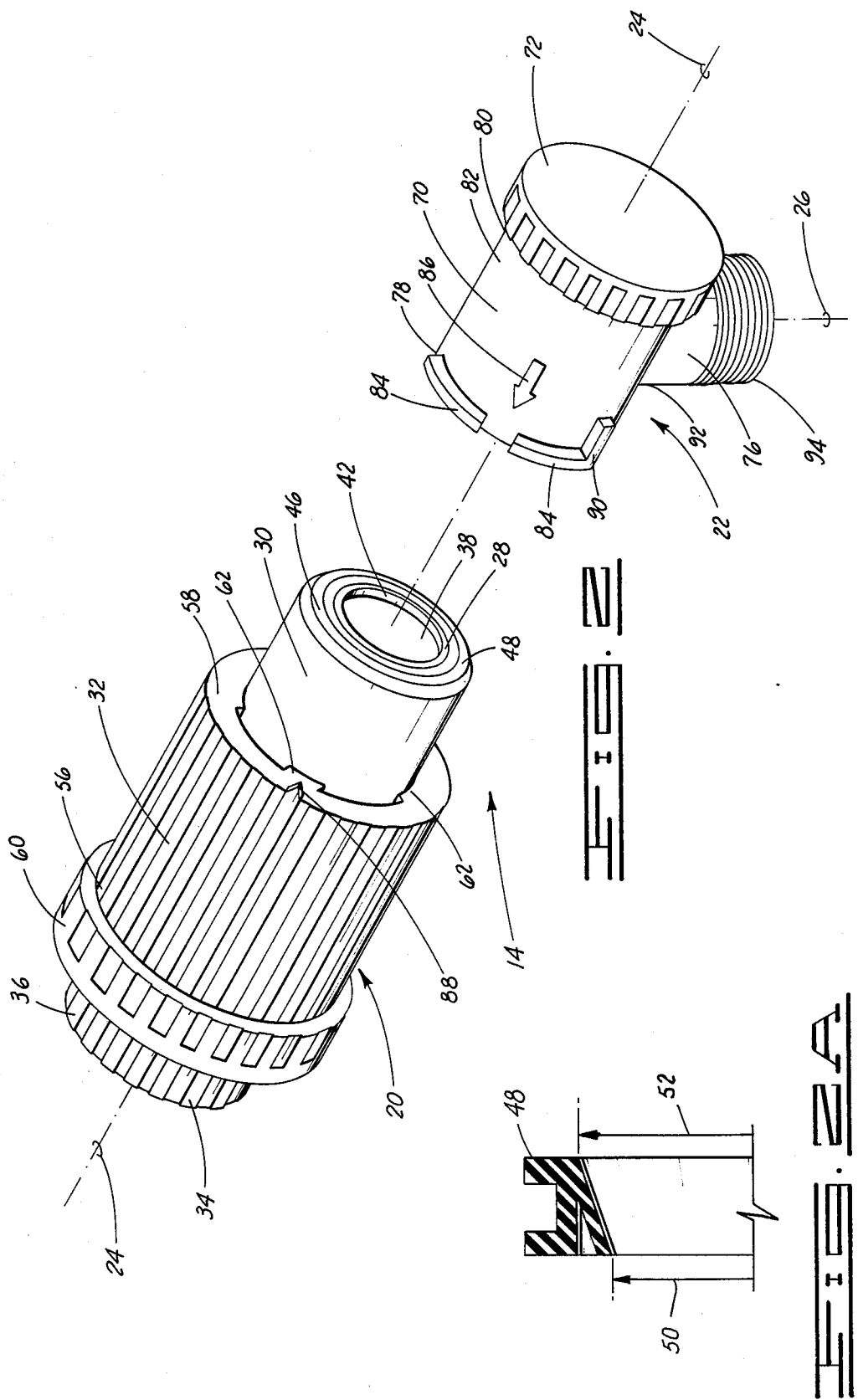
FIG. 2 is an isometric view of a male unit and a female unit disengaged.

Referring to FIG. 2, shown therein are the male unit 20 and the female unit 22 in a disengaged state, i.e. not operatively engaged. The male unit 20 and the female unit 22 are addressing each other along the first flow axis 24, and the male unit 20 is upstream from the female unit 22. Several components of the male unit 20 are shown, including a male barrel member 28, a slide member 30, a collar member 32, and a threaded input column 34. Fluid is conducted through the interior of the male barrel member 28 when the coupling device 14 is operatively engaged.

Figure 3:
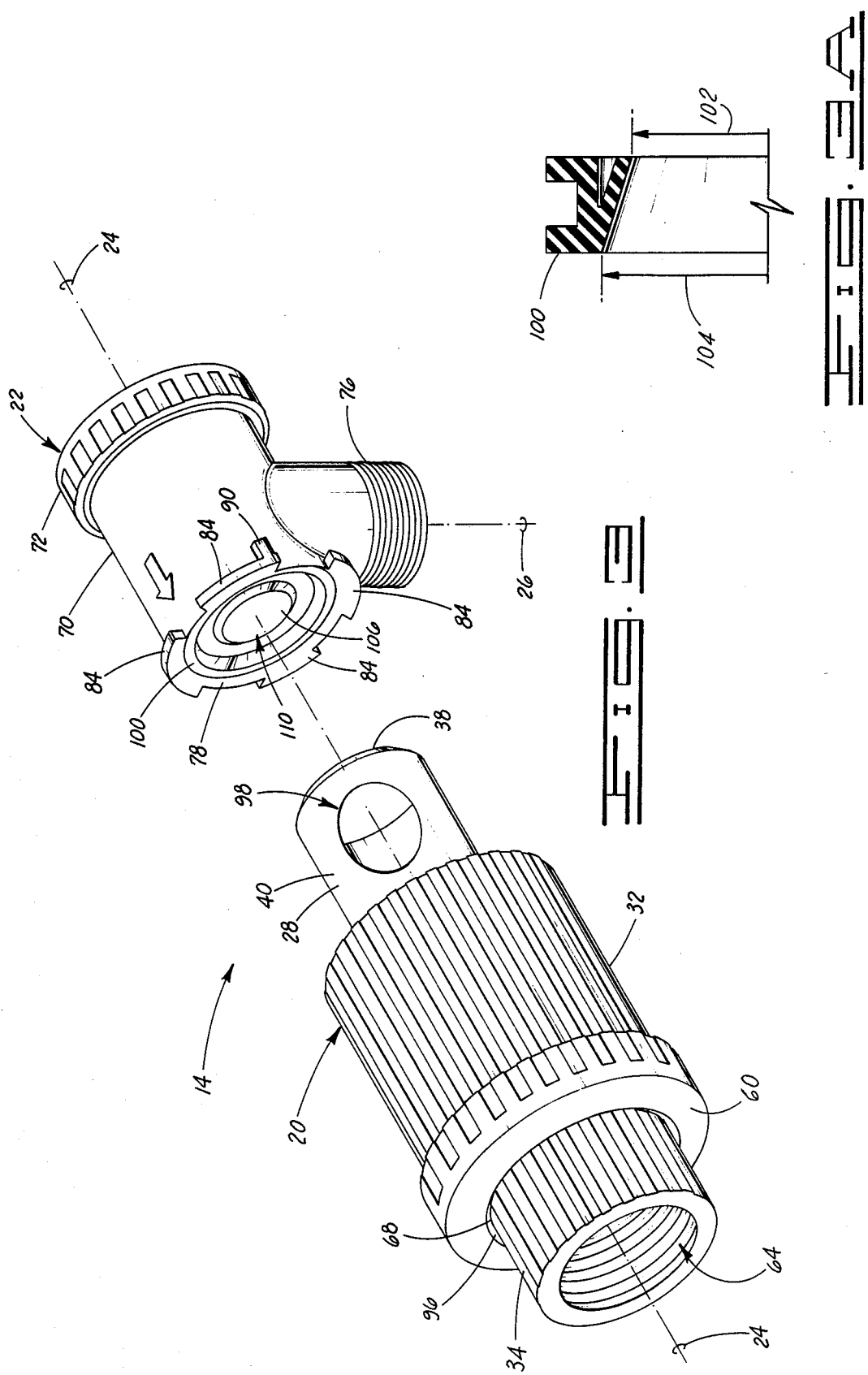
FIG. 3 is an isometric view of the male unit and the female unit disengaged.

The male barrel member 28 has an upstream end 36 (shown in FIG. 4), a downstream end 38 and an exterior wall 40 (shown in FIG. 3). Preferably, the downstream end 38 of the male barrel member 28 has a frusto-conically shaped lip 42 extending downstream from the plane of the downstream end 38. The downstream end 38 of the male barrel member 28 is impermeable to fluids. Generally, the downstream end 38 of the male barrel member 28 can be designed in any shape which is conducive to reception by the female unit 22.

The male barrel member 28 is telescopically disposed inside the slide member 30 which is exterior to and coaxial with the male barrel member 28. The slide member 30 has an upstream end 44 (shown in FIG. 4) and a downstream end 46. The downstream end 46 of the slide member 30 is frusto-conically shaped and has a first annular seal member 48 mounted thereon. The first annular seal member 48, being telescopically mounted within the frusto-conically shaped downstream end 46 of the slide member 30, telescopically receives the male barrel member 28. The first annular seal member 48 is preferably pliable, impermeable to fluids and extends slightly upstream from the frusto-conically shaped downstream end 46 of the slide member 30 along the first flow axis 24.

At the furthest point upstream that the first annular seal member 48 extends, the first annular seal member 48 has an upstream radius 50 (FIG. 2A) about the first flow axis 24. At the location where the first annular seal member 48 is mounted on the frusto-conically shaped downstream end 46, the first annular seal member 48 has a downstream radius 52 about the first flow axis 24. That is, the first annular seal member 48 gets closer to the first flow axis 24 as it extends upstream so that the upstream radius 50 of the first annular seal member 48 is slightly less than the downstream radius 52. The upstream radius 50 of the first annular seal member 48 is such that the exterior wall 40 of the male barrel member 28 abuts and is sealed by the first annular seal member 48 so that fluid can not flow upstream past the first annular seal member 48 along the exterior wall 40 of the male barrel member 28.

The length of the slide member 30 (along the first flow axis 24) is approximately half that of the length of the male barrel member 28. The slide member 30 slides along the first flow axis 24 relative to the male barrel member 28. The maximum downstream position of the slide member 30 relative to the male barrel member 28 is an extended position. In the extended position, the downstream end 46 of the slide member 30 is at the same position along the first flow axis 24 as the downstream end 38 of the male barrel member 28. In FIG. 2, the slide member 30 is depicted in the extended position. It is biased towards the extended position by a biasing spring 54 (shown in FIG. 4) which is disposed about a portion of the male barrel member 28.

Figure 4:
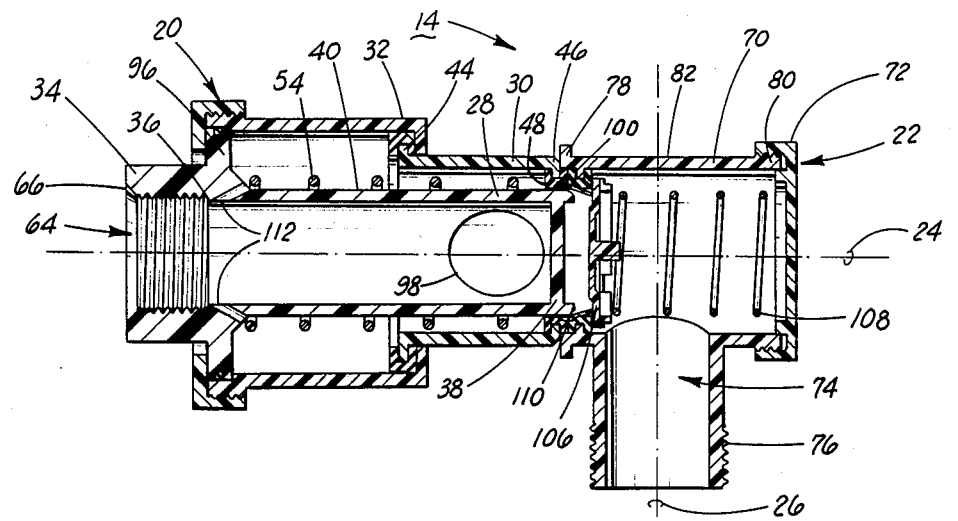
FIG. 4 is a cross sectional view of the male unit and female unit touching but disengaged.

Still referring to FIGS. 2 and 4, the collar member 32 is coaxial with and exterior to both the male barrel member 28 and the slide member 30. The collar member 32, which has an upstream end 56 and a downstream end 58, is immobile relative to the male barrel member 28. The upstream end 56 of the collar member 32 is at the same location along the first flow axis 24 as the upstream end 36 of the male barrel member 28 (FIG. 4). The upstream end 56 of the collar member 32 is threaded, and mounted exterior thereto and coaxial therewith is a threaded removable first cap 60. The first cap 60 is impermeable to fluids and, when screwed onto the upstream end 56 of the collar member 32, assures that no fluid between the exterior wall 40 of the male barrel member 28 and the collar member 32 will be lost. When the first cap 60 is removed from the upstream end 56 of the collar member 32, the male unit 20 can be disassembled by sliding the collar member 32 downstream relative to the male barrel member 28.

On the downstream end 58 of the collar member 32 are disposed a plurality of collar dog members 62 which extend inwardly toward the first flow axis 24 to define a concentric ring thereabout. The collar dog members 62 telescopically receive the slide member 30 and serve to guide the slide member 30 as it moves relative to the male barrel member 28 to keep the components of the male unit 20 coaxial. In the extended position of the slide member 30, the collar dog members 62 abut the upstream end 44 of the slide member 30 and prevent the slide member 30 from going further downstream relative to the male barrel member 28.

The threaded input column 34 is attached to, the upstream end 36 of the male barrel member 28 to provide a male input port 64 (FIG. 4). The threaded input column 34 has an upstream end 66 and is coaxial with the male barrel member 28, the slide member 30, the collar member 32, and the male input port 64 (FIG. 4). The threaded input column 34 receives the upstream flow conducting member 12 (FIG. 1) for the purpose of interconnecting the coupling device 14 with a fluid vessel. The threaded input column 34 via the male input port 64 (FIG. 4) guides fluid into the male barrel member 28 where it can be further conducted upstream when the coupling device 14 is operatively engaged. Likewise, when the flow direction is reversed, the threaded input column 34 guides fluid out of the male barrel member 28.

The female unit 22 is directly downstream from and coaxial with the male unit 20. The female unit 22 is comprised of components including a female barrel member 70, a threaded removable second cap 72, a female output port 74 (FIG. 4), and a threaded output column 76. The female barrel member 70 has an upstream end 78, a downstream end 80 and an exterior wall 82. The upstream end 78 of the female barrel member 70 is open faced.

Disposed along the exterior wall 82 at the upstream end 78 of the female barrel member 70 is a plurality of female barrel dogs 84. For ease of engagement, a female arrow 86 is formed in the exterior wall 82 of the female barrel member 70, and a male arrow 88 is formed on the downstream end 58 of the collar member 32. When the female arrow 86 is aligned with the male arrow 88, the female barrel dogs 84 are disposed such that, when adjacent to the collar dogs 62, they will mesh with the collar dogs 62 to permit penetration into the interior of the collar member 32.

On one of the female barrel dogs 84 is affixed a tab 90. When the female barrel dogs 84 penetrate into the interior of the collar member 32, and the male unit 20 can be manually rotated relative to the female unit 22 along the first flow axis 24, the tab 90 will abut one of the collar dogs 62 to prevent further relative rotation in that direction.

In FIG. 2, the female barrel member 70 is shown coaxial with the male barrel member 28, the slide member 30, the collar member 32 and the threaded input column 34. The downstream end 80 of the female barrel member 70 (FIG. 4) is open faced and threaded to receive the removable second threaded cap 72. The second threaded cap 72 is screwed onto the downstream end 80 of the female barrel member 70 and, being impermeable to fluids, prevents escape of fluids therethrough.

Along the bottom of the female barrel member 70 is the female output port 74 (shown in FIG. 4). The female output port 74 is an open space in the female barrel member 70. The female output port 74 is the site where fluid is conducted from the first flow axis 24 to the second flow axis 26 and vice versa. The female barrel member 70 is affixed to the threaded output column 76 at the female output port 74 (shown in FIG. 4). The output column 76 has an upstream end 92 and a downstream end 94. The output column 76 is affixed to the female barrel member 70 at the upstream end 92. The downstream end 94 of the output column 76 is threaded to connect to the downstream flow conducting member 16 and storage tank 18 (see FIG. 1).

Attention is now directed to FIG. 3 where another isometric view of the male unit 20 and the female unit 22 is depicted. As in FIG. 2, the male unit 20 and female unit 22 are in a disengaged state and again are addressing each other along the first flow axis 24.

A portion of a male barrel flange 96 is visible between the first threaded cap 60 and the upstream end 66 of the input column 34. The slide member 30 is in its retracted position and so is hidden by the collar member 32, thereby exposing a male output port 98 in the male barrel member 28. It should be noted that the slide member 30 would not normally be in the retracted position of FIG. 3 without an upstream directed force on its downstream end 46, but the slide member 30 is depicted in the retracted position to provide a view of the male output port 98. The male output port 98, an opening in the male barrel member 28, is selectively disposed so as to be indexed with the female output port 74 when the coupling device 14 is operationally engaged.

The upstream end 78 of the female barrel member 70, as shown in FIG. 3, has an inverse frusto-conical shape and is designed to abut the frusto-conically shaped downstream end 46 of the slide 30 to push the slide 30 upstream relative to the male barrel member 28 as the male and female units 20, 22 are brought together. The four female barrel dogs 84 at the periphery of the upstream end 78 of the female barrel member 70 are shown in the view provided by FIG. 3.

A second annular seal member 100, preferably pliable and fluid impermeable, is mounted on the upstream end 78 of the female barrel member 70 to extend slightly downstream along the first flow axis 24. At the furthest point downstream that the second annular seal member 100 extends, the second annular seal member 100 has a downstream radius 102 about the first flow axis 24 (FIG. 3A). At the location where the second annular seal member 100 is mounted on the upstream end 78 of the female barrel member 70, the second annular seal member 100 has an upstream radius 104 about the first flow axis 24. The downstream radius 102 of the second annular seal member 100 is less than the upstream radius 104 of the second annular seal member 100. Thus, the second annular seal member 100 gets closer to the first flow axis 24 as it extends downstream so that it retains any fluid moving upstream.

A saucer shaped plunger member 106 is disposed inside the female barrel member 70 and is biased by a spring 108 (FIG. 4) to seal the open upstream end 78 thereof which forms a female input port 110. As upstream end 78 of the female barrel member 70 abuts the plunger member 106, the downstream end of the second annular seal member 100 seals about the plunger member 106. The plunger member 106, movable relative to the female barrel member 70 along the first flow axis 24, has an extended position and a retracted position. At the extended position, the plunger member 106 abuts the upstream end 78 of the female barrel member 70. At the retracted position, the plunger member 106 and the spring 108 are compressed against the second threaded cap 72. At the extended position, the second annular seal member 100 seals against the plunger member 106 so that fluid cannot enter nor exit the female input port 110 of the female barrel member 70.

Referring to FIG. 4, the male unit 20 and female unit 22 are shown in cross section in a disengaged state, addressing each other along the first flow axis 24. The downstream end 46 of the slide member 30 abuts the upstream end 78 of the female barrel member 70. The downstream end 38 of the male barrel member 28 does not abut the plunger member 106.

Both the slide member 30 and the plunger member 106 are in their respective extended positions. The slide spring 54 is disposed between the downstream end 46 of the slide member 30 and the male barrel flange 96. The plunger spring 108 is disposed between the plunger member 106 and the second removable threaded cap 72.

The male output port 98 is open to the interior of the slide member 30 so any fluid entering via the male input port 64 can travel downstream along the interior of the male barrel member 28 and can then wash into the respective interiors of the slide member 30 and the collar member 32, via the male output port 98. The interior of the slide member 30 and the interior of the collar member 32 openly communicate.

Fluid and pressure buildup is alleviated by a plurality of bleed ports 112, disposed near the male input port 64 to create a channel between the interior of the collar member 32 and the male output port 98. Preferably there are four bleed ports 112 placed equidistantly around the periphery of the upstream end 36 of the male barrel member 28.

Figure 5:
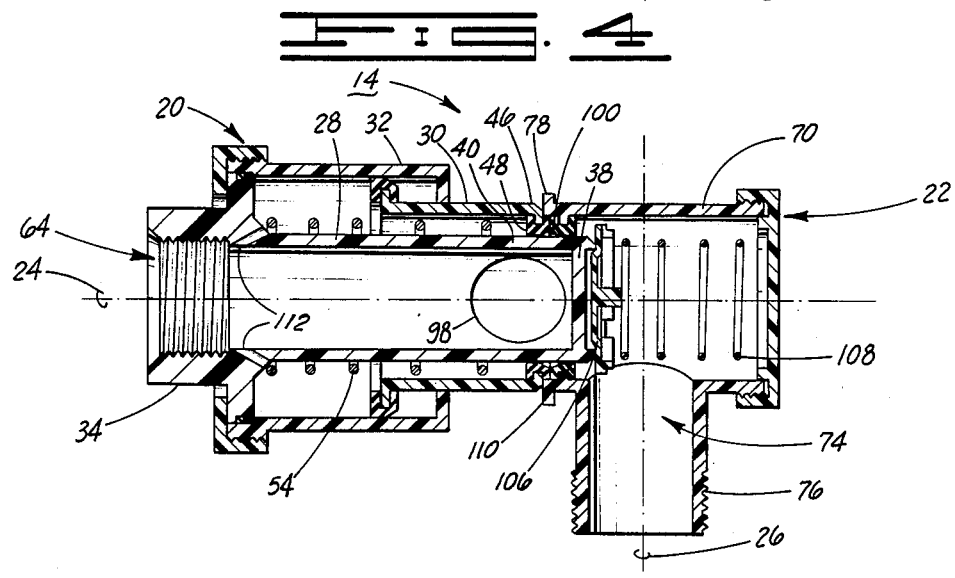
FIG. 5 is a cross sectional view of the male unit and female unit partially engaged.

Referring to FIG. 5, the male unit 20 and female unit 22 are shown in a partially engaged state, i.e. the male barrel member 28 has penetrated into the female barrel member 70 but the downstream end 38 of the male barrel member 28 has not yet reached its maximum downstream position relative to the female output port 74 so the coupling device 14 is not yet operationally engaged. The male barrel member 28 has entered the female barrel member 70 via the female input port 110. The downstream end 38 of the male barrel member 28 abuts the plunger member 106 and pushes it downstream as the male barrel member 28 advances, thereby also compressing the plunger spring 108. The exterior wall 40 of the male barrel member 28 is sealed by the second annular seal member 100 as the male barrel member 28 advances through the female input port 110.

The upstream end 78 of the female barrel member 70 continues to abut the downstream end 46 of the slide member 30. The slide member 30 is therefore moved upstream relative to the male barrel member 28 and prevented from entering the female barrel member 70. The slide spring 54 is compressed by this relative movement. If there is fluid or pressure buildup in the interior of the slide member 30 or the interior of the collar member 32, the bleed ports 112 serve to alleviate that buildup by allowing the fluid or pressure to escape back to the male input port 64.

Figure 6:
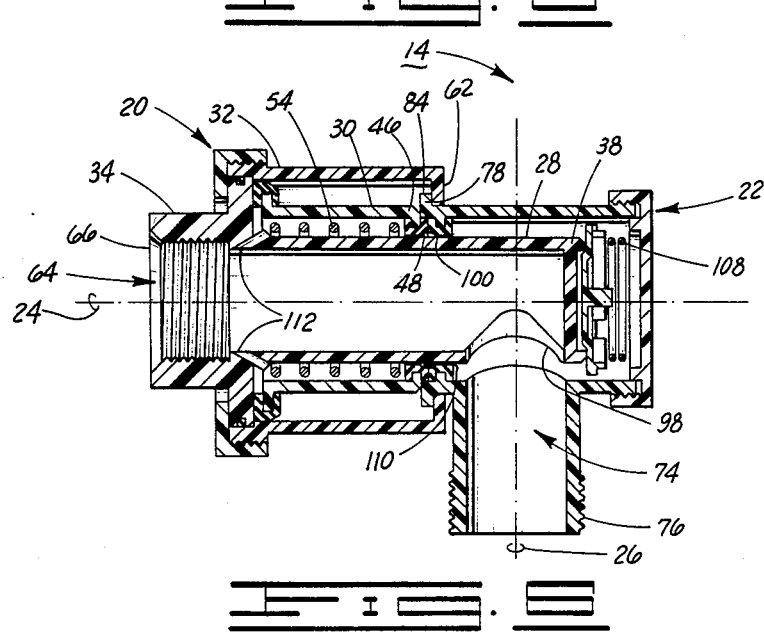
FIG. 6 is a cross sectional view of the male unit and female unit operatively engaged.

Referring to FIG. 6, the coupling device 14 is shown in the operationally engaged state. The downstream end 38 of the male barrel member 28 has reached its maximum downstream position relative to the female output port 74. At this position, the male unit 20 has been rotated about the first flow axis 24 relative to the female unit 22. The female barrel dogs 84 have meshed with and then moved immediately upstream from the collar dogs 62 so that the female barrel dogs 84 have penetrated into the interior of the collar member 32. At the point where the male output port 98 indexes with the female output port 74, further rotation in the direction of rotational engagement is not possible because the tab 90 abuts the first collar dog 62 it encounters.

The slide spring 54 and the plunger spring 108 are both maximally compressed and the coupling device 14 is locked in the operationally engaged state by the respective compression forces which are colinear and oppositional. Fluid cannot enter the coupling device 14 where the upstream end 78 of the female barrel member 70 abuts the downstream end 46 of the slide member 30, and the male barrel member 28 is sealingly engaged by the first annular seal member 48 and the second annular seal member 100.

In the operationally engaged state, there is an open, unobstructed channel for fluid flow starting at the upstream end 66 of the input column 34 and moving downstream through the male input port 64, the length of the male barrel member 28, through the male output port 98, the female output port 74 and finally down the output column 76. Thus, when the input column 34 is connected to a first flow conducting member and the output column 76 is connected to a second flow conducting member (FIG. 1), fluid can be conducted from one vessel to another via the operationally engaged coupling device 14.

It is clear that the present invention is well adapted to carry out the objects and attain the advantages mentioned as well as those inherent therein. While the presently preferred embodiment of the invention has been described for purposes of this disclosure, numerous changes can be made which will readily suggest themselves to those skilled in the art and which are encompassed within the spirit of the invention disclosed and as defined by the appended claims.

What is claimed is:

1. A coupling device for interconnecting flow conducting members comprising:

a male barrel member defining a first flow axis and having an upstream end and a downstream end, the male barrel member having a male input port at its upstream end and a male output port disposed near its downstream end, the male barrel member having male barrel flange disposed near the upstream end thereof;

a slide member slidably mounted on the exterior of the male barrel member and coaxial therewith, the slide member having an upstream end and a downstream end and slide flange at the upstream end thereof, the slide member further having a retracted position and an extended position;

means for biasing the slide member toward its extended position;

a collar member coaxial with, and exterior to, the collar member being mounted on the male barrel member and shaped to guide the slide member so that the side member is movable between its retracted position and its extended position, the slide member covering the male output port when in its extended position;

a female barrel member having an upstream end and a downstream end, the female barrel member having a female input port at its upstream end and having a female output port;

plunger means for selectively sealing and opening the female input port, the plunger means comprising:

an annular seal member supported by the female barrel member at the female input port; a plunger member; and bias means for biasing the plunger member in sealing engagement with the annular seal member, the plunger member being movable away from the annular seal member and in the downstream direction by the male barrel member as the male barrel member penetrates the female input port;

connecting means for connecting the female barrel member to the collar member, so that upon connection of the female barrel member and the collar member the downstream end of the slide member is abuttingly engaged by the upstream end of the female barrel member to move the slide member to its retracted position to open the male output port, the downstream end of the male barrel member disposed to penetrate the female input port to move the plunger means downstream to index the male output port adjacent to the female output port so that an unobstructed channel for fluid flow is provided between the upstream end of the male barrel member and the female output port.

2. The coupling device of claim 1 further comprising: an annular seal member supported by the slide member for forming a seal between the downstream end of the slide member and the male barrel member.

3. A coupling device for interconnecting flow conducting members comprising:

a male barrel member defining a first flow axis and having an upstream end and a downstream end, the male barrel member having a male input port at its upstream end and a male output port disposed near its downstream end, a male barrel flange disposed near the upstream end of the male barrel member and the downstream end thereof having a frusto-conically shaped lip extending therefrom;

a slide member slidably mounted on the exterior of the male barrel member and coaxial therewith, the slide member having an upstream end and a downstream end and a slide flange at the upstream end thereof, the slide member having a retracted position and an extended position, the downstream end of the slide member being frusto-conical shaped;

means for biasing the slide member toward its extended position;

a collar member coaxial with, and exterior to, the male barrel member and the slide member, the collar member being mounted on the male barrel member and shaped to guide the slide member so that the slide member is movable between its retracted position and its extended position, the slide member covering the male output port when in the its extended position;

a female barrel member having an upstream end and a downstream end, the female barrel member having a female input port at its upstream end and having a female output port, the upstream end of the female barrel member being inversely frusto-conical shaped to receive the downstream end of the slide member;

plunger means for selectively sealing and opening the female input port, the plunger means comprising:
a second annular seal member supported by the female barrel member at the female input port;
a plunger member; and
bias means for biasing the plunger member toward the second annular seal member, the plunger member being movable in the downstream direction by the male barrel member as it penetrates the female input port; and connecting means for connecting the female barrel member to the collar member, so that upon connection of the female barrel member and the collar member the downstream end of the slide member is abuttingly engaged by the upstream end of the female barrel member to move the slide member to its retracted position to open the male output port, the downstream end of the male barrel member disposed to penetrated the female input port to move the plunger means downstream to index the male output port and the female output port, the connecting means comprising a plurality of collar dogs located on the downstream end of the collar member and a plurality of female barrel dogs located on the upstream end of the female barrel member so that the plurality of collar dogs mesh with the plurality of female barrel dogs when the male unit is connected with the female unit, the male unit then being rotatable with respect to the female unit to a point where the male output port and female output port are indexed and the collar dogs and the female barrel dogs maintain the coupling device in operational engagement.

4. The coupling device of claim 3 wherein one of the female barrel dogs has a tab which abuts one of the collar dogs when the male output port and female output port are indexed so that further rotation of the male unit with respect to the female unit in the direction of rotational engagement is prevented.

5. The coupling device of claim 4 wherein the female barrel member comprises:
a threaded output column defining a second flow axis, the threaded output column disposed at the female output port.

6. The coupling device of claim 5 wherein the male barrel member comprises:
a threaded input column coaxial with the first flow axis and disposed at the male input port.

7. The coupling device of claim 6 wherein the upstream end of the collar member is threaded, the collar member comprising:
a threaded first cap threadingly connectable to the upstream end to retain the collar member against the flange of the male barrel member.

8. The coupling device of claim 7 wherein the downstream end of the female barrel member is threaded, the female barrel member further comprising:
a threaded second cap threadingly connectable to the downstream end of the female barrel member.

9. The coupling device of claim 8 wherein a plurality of bleed ports are disposed near the upstream end of the male barrel member just downstream from the male input port.

10. The coupling device of claim 9 wherein the biasing means for the slide member is a slide spring disposed between the downstream end of the slide member and the male barrel flange.

11. The coupling device of claim 10 wherein the biasing means for the plunger member is a plunger spring disposed between the plunger member and the second removable threaded cap.

* * * * *

UNITED STATES PATENT AND TRADEMARK OFFICE
CERTIFICATE OF CORRECTION

PATENT NO. : 4,844,408

DATED : July 4, 1989

INVENTOR(S) : Brook J. Beaston

It is certified that error appears in the above-identified patent and that said Letters Patent is hereby corrected as shown below:

```
In column 4, line 48, the words "to, the" should read
--to the--.  In claim 1, column 8, line 26, before the
word "collar" add the following words --male barrel member
and the slide member, the--.
```

Signed and Sealed this

Fourth Day of September, 1990

Attest:

HARRY F. MANBECK, JR.

*Attesting Officer*   *Commissioner of Patents and Trademarks*